Dec. 2, 1941. P. C. JONES 2,264,759
METHOD OF PREPARING AMINO ALIPHATIC HYDROGEN SULPHATES
Filed July 26, 1939
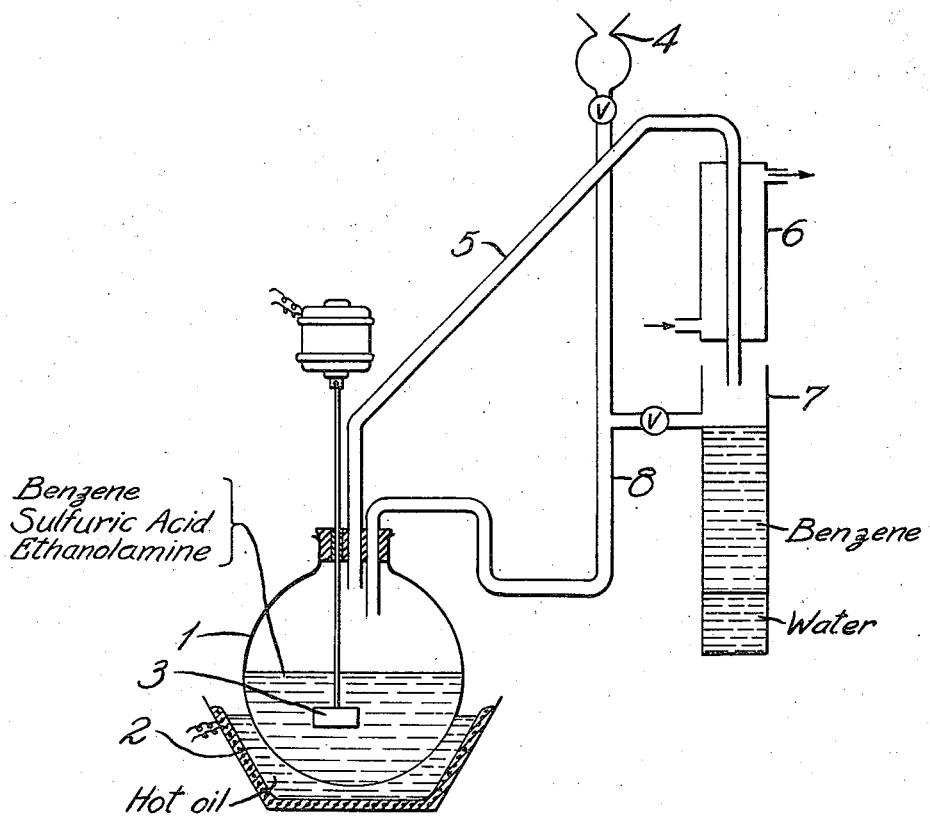
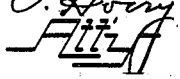

Patented Dec. 2, 1941

2,264,759

UNITED STATES PATENT OFFICE 2,264,759

METHOD OF PREPARING AMINO ALIPHATIC HYDROGEN SULPHATES

Paul C. Jones, Akron, Ohio, assignor to The B. F. Goodrich Company, New York, N. Y., a corporation of New York Application July 26, 1939, Serial No. 286,639

4 Claims. (Cl. 260—458)

This invention relates to a new method of preparing amino aliphatic hydrogen sulphates.

It is well known that amino aliphatic hydrogen sulphates may be prepared by reacting hydroxy aliphatic amines with concentrated sulphuric acid. It has been rather difficult, however, to accomplish the dehydration which is necessary to drive the reaction to completion. Various unsatisfactory methods have been used for removing the water split off in the esterification. High temperature distillation will remove the water, but the product is charred and purification is required before it is suitable for certain further syntheses, such as the formation of 2-mercaptothiazoline by reaction with sodium hydroxide and carbon disulphide.

By the method of this invention, the intermediate products, hydroxy aliphatic ammonium hydrogen sulphates, are converted to the desired amino aliphatic hydrogen sulphates by distilling at atmospheric pressure the reaction mixture in the presence of a liquid organic solvent until the water formed by the reaction is removed. By this method, a practically quantitative yield of a slurry of the amino aliphatic hydrogen sulphate in an organic solvent is obtained, which product is suitable for use in further reactions without purification.

Suitable liquid organic solvents include the hydrocarbons such as benzene, xylene, toluene, solvent naphtha, gasolene, etc. Chlorinated aromatic hydrocarbon solvents are equivalent to the hydrocarbons in the process of this invention, so materials such as monochlorbenzene, orthodichlorbenzene, mixed chlortoluenes, etc. may be employed instead of the aromatic hydrocarbons if desired, although benzene and its liquid homologues are preferred. The successful practice of the method of this invention is independent of the solubility of the product in the solvent.

The removal of the water from the reaction mixture may be carried out by simply adding the organic solvent to the reaction mixture and distilling at atmospheric pressure until the distillate is anhydrous. Since the ratio of water to organic solvent in the distillate is small, rather large amounts of solvent are required. It is preferred, therefore, to employ only a small amount of organic solvent, and to continuously return the solvent to the reaction mixture. This may be accomplished in an apparatus illustrated schematically in the accompanying drawing.

A mixture of organic solvent and sulphuric acid is placed in the flask 1 supplied with heating means 2, a stirrer 3, and a dropping funnel 4, through which the alkanol amine is added. The mixture of solvent and water which distills out of the flask is passed through the tube 5, the condenser 6, and into a receiver 7, where the water settles to the bottom. The organic solvent is returned to the flask through the tube 8 containing a trap. The process is continued until the amount of water calculated to have been split off in the reaction has been collected.

As a specific example of the method of this invention, beta-aminoethyl hydrogen sulphate was prepared by esterifying ethanolamine with sulphuric acid.

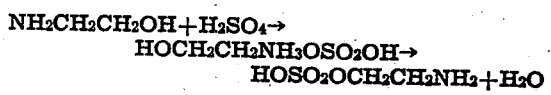

$NH_2CH_2CH_2OH + H_2SO_4 \rightarrow$
$HOCH_2CH_2NH_3OSO_2OH \rightarrow$
$HOSO_2OCH_2CH_2NH_2 + H_2O$ 1545 g. of 96% sulphuric acid and 3000 c. c. of benzene were placed in the flask 1, stirring was started, and 915 g. of ethanolamine were slowly added through the dropping funnel. The heat of neutralization was sufficient to cause the benzene to boil. After all of the ethanolamine had been added, distillation was continued by means of an oil bath heated to 105–115° C. The benzene was continuously returned to the flask, and the distillation was continued until 347 c. c. of water had been collected and the benzene distillate was anhydrous. There remained in the flask, in suspension in benzene, a practically quantitative yield of the desired beta-aminoethyl hydrogen sulphate which was successfully employed in further reactions without any additional treatment.

This example is merely illustrative, and is susceptible of many variations. In other experiments, the sulphuric acid was added to a solution of the ethanolamine in an organic solvent. While this gave good results, the reaction was somewhat more vigorous than the reaction in the preceding example. The organic solvent need not be present during the entire esterification, but may be added after the esterification process has reached a preliminary equilibrium if desired.

The method of this invention is generally applicable to any esterification reaction between a hydroxy aliphatic amine and sulphuric acid. Thus in place of the ethanolamine, amines such as diethanolamine, triethanolamine, 3-aminopropyl alcohol, 3-aminobutyl alcohol, n-butanolamine, 2-aminocyclohexyl alcohol, 1-ethyl-2-amino-propyl alcohol, etc. may be employed.

Many other modifications of the method herein disclosed will be apparent to those skilled in the art, and are accordingly within the spirit and scope of the invention as defined in the appended claims.

I claim:

1. The method of removing water produced in the esterification of a hydroxy aliphatic amine by sulphuric acid which comprises distilling, until the water is removed, the reaction mixture in the presence of a liquid organic solvent of the class consisting of hydrocarbons and chlorinated hydrocarbons.

2. The method of dehydrating a hydroxyalkyl ammonium hydrogen sulphate which comprises distilling until the water is removed in the presence of a liquid hydrocarbon solvent.

3. The method which comprises reacting concentrated sulphuric acid and an alkanolamine in the presence of a liquid hydrocarbon solvent, heating the reaction mixture to boiling, condensing the distillate, removing the water from the condensate, returning the liquid hydrocarbon solvent to the reaction mixture, and continuing the process until the distillate consists solely of hydrocarbon solvent.

4. The method of claim 3 in which the alkanolamine is ethanolamine and the solvent is a member of the class consisting of benzene and its liquid homologues.

PAUL C. JONES.